(12) United States Patent
Sun (10) Patent No.: US 7,016,644 B2
(45) Date of Patent: Mar. 21, 2006

(54) COMPENSATING FOR NON-LINEARITY IN AN OVERLAID COMMUNICATION SYSTEM

(75) Inventor: Feng-Wen Sun, Germantown, MD (US)

(73) Assignee: Hughes Network Systems LLC, Germantown, MD (US)

( * ) Notice: Subject to any disclaimer, the term of this patent is extended or adjusted under 35 U.S.C. 154(b) by 600 days.

(21) Appl. No.: 10/371,425

(22) Filed: Feb. 21, 2003

(65) Prior Publication Data

US 2004/0166800 A1    Aug. 26, 2004

(51) Int. Cl.
*H04B 7/185* (2006.01)

(52) U.S. Cl. .................... 455/12.1; 455/22; 455/13.4

(58) Field of Classification Search ............... 455/12.1, 455/22, 13.4, 115.1, 126, 427, 429, 115.3, 455/127.1; 330/149; 370/527, 529; 375/297
See application file for complete search history.

(56) References Cited

U.S. PATENT DOCUMENTS

| 2002/0168973 A1* | 11/2002 | Dent et al. | .................. 455/427 |
| 2004/0192330 A1* | 9/2004 | Gaal | ........................ 455/456.1 |
| 2005/0020219 A1* | 1/2005 | Sih et al. | .................... 455/130 |
| 2005/0032472 A1* | 2/2005 | Jiang et al. | ................ 455/13.4 |

\* cited by examiner

*Primary Examiner*—Tilahun Gesesse
*Assistant Examiner*—Tan Trinh
(74) *Attorney, Agent, or Firm*—Craig Plastrik (57) ABSTRACT

An approach is provided for compensating for non-linearity in an overlaid radio communication system, such as a satellite network, wherein a terminal and a hub station communicates bi-directionally using a composite signal that is transmitted from a relay station and includes an inbound signal overlaid with an outbound signal. A look-up table stores information used to determine an inverse of a function associated with a non-linear effect of a received composite signal. The inbound signal has a predetermined spectral configuration. The device also includes a multiplier configured to generate a product of the look-up table and the received composite signal. Also, the device includes an estimation module configured to output an estimate of the inbound signal based upon the product. Further, the device includes a filter configured to filter the estimate of the inbound signal according to the predetermined spectral configuration, wherein the filtered estimate is utilized to refine an estimate of the instantaneous operating point of an amplifier associated with the non-linearity (e.g., satellite transponder), wherein an output signal representing the inbound signal is generated based upon the refined estimate.

28 Claims, 8 Drawing Sheets

COMPENSATING FOR NON-LINEARITY IN AN OVERLAID COMMUNICATION SYSTEM

FIELD OF THE INVENTION

The present invention relates to a communications system, and more particularly to overlaying signals for bi-directional communication.

BACKGROUND OF THE INVENTION

Modern satellite communication systems provide a pervasive and reliable infrastructure to distribute voice, data, and video signals for global exchange and broadcast of information. These satellite communication systems have emerged as a viable option to terrestrial communication systems. Satellite communication systems are susceptible to service disruptions stemming from changing channel conditions, such as fading because of weather disturbances. Additionally, such systems cannot readily increase capacity as the number of satellite transponders is fixed. Further, channel interference constrains system capacity. As a result, efficient frequency reuse schemes are vital to the profitability of these satellite communication systems.

Figure 8:
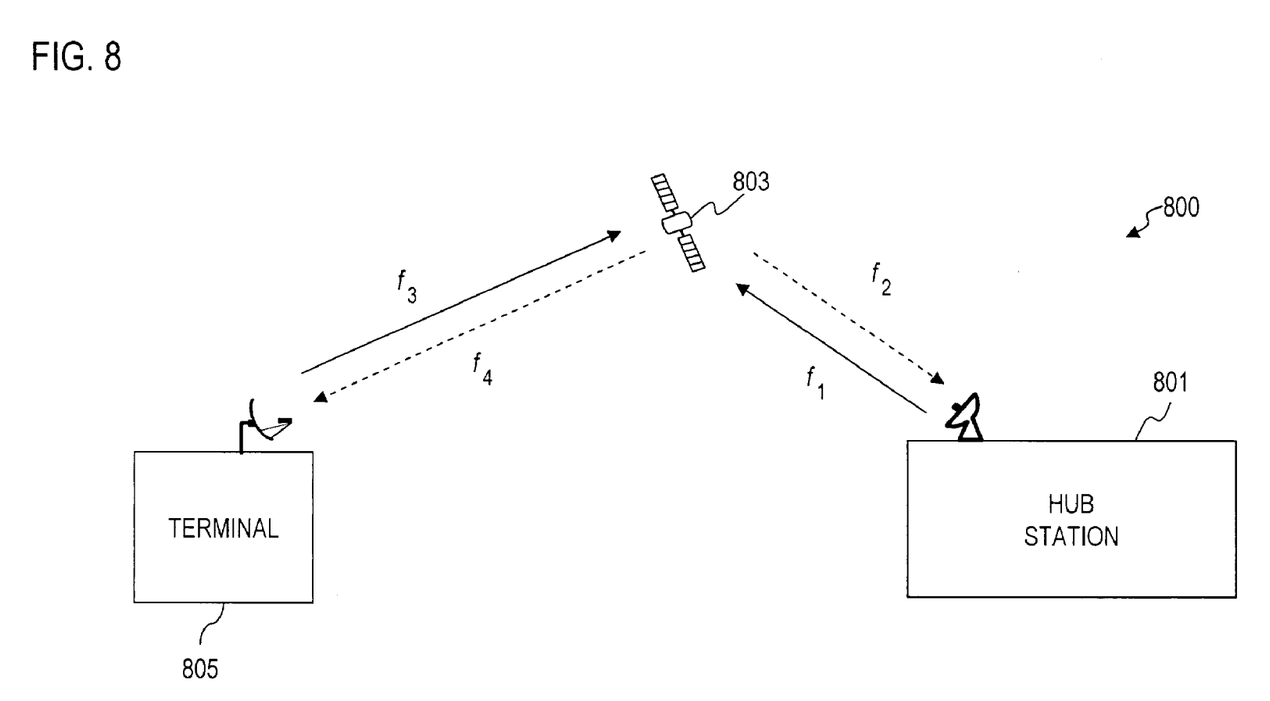
FIG. 8 is a diagram of a conventional satellite system in which inbound and outbound signals utilize unique frequency assignments.

FIG. 8 is a diagram of a conventional satellite system in which inbound and outbound signals utilize unique frequency assignments. A two-way satellite system 800 includes a hub station 801 that transmits outbound signals to a satellite 803 over a first carrier frequency, $f_1$, and receives inbound signals from the satellite 803 over a second carrier frequency, $f_2$. Concurrently, the satellite 803 can communicate with a remote satellite terminal 805, which utilizes two other frequencies, $f_3$, and $f_4$, to transmit and receive, respectively. This arrangement is typical of a two-way satellite communication system, whereby the hub station 801 transmits content to multiple Very Small Aperture Terminals (VSATs) 805 (in which one is shown). The use of unique frequencies by the terminal 805 and the hub station 801 ensures that channel interference is minimized. The drawback, however, is that a large number of frequencies are required when terminals are added to the system 800. As spectrum is a precious resource, it is vital to use the spectrum efficiently.

An improvement to the system 800 requires sharing of the satellite transponder for the inbound signals and the outbound signals. The efficiency of the spectrum sharing can be measured in the total throughput achieved by the inroute and outroute. Alternatively, if the outbound throughput is maintained at the same level as that of system without sharing the spectrum with the inroutes, the throughput achieved by the inbounds are gained by the system. Different schemes will yield different gains. In particular, when compared with traditional systems, significant gain can be realized by properly modeling and compensating the impact of the transmission channel. Conventional approaches assume that both inbounds and outbound share an ideal linear channel. As a result of this assumption, large uncompensated mutual interference exists between the inbound signals and the outbound signals.

Conventionally, to mitigate this mutual interference, spread spectrum techniques are utilized, wherein the average energy of the inbound signal is spread over a bandwidth that is much wider than the information bandwidth. Using spread spectrum transmission in the same transponder for both the inbound and outbound signals conserves space segment resources. However, transmitted power levels must be very low in order to minimize interference to the forward link; and as a result, spread spectrum techniques results in very limited capacity of each link, such that information bit rates on the return links tend to be low.

Furthermore, spread spectrum inbound signals are deployed to combat the channel impairments. A drawback with this approach is that overall system capacity is reduced. In addition, the impairments are greater if the inbound signals are Time Division Multiple Access (TDMA)-based instead of Code Division Multiple Access (CDMA)-based. In particular, it is recognized that the communication channels within the system 800 may exhibit non-linear characteristics, notably from the amplifiers within the transponders. Conventional systems fail to compensate for this non-linear behavior. Further, the transponder introduces group delay stemming from a noise-limiting filter applied before the amplifier. The non-linear effects and the group delay impede performance of a shared transponder scheme. It is noted that, in general, a number of techniques exist for compensating non-linear effects of an amplifier. However, conventional techniques are not applicable to spectrum sharing. In the spectrum sharing situation, the impact of these channel impairment exhibits completely different behaviors. Such channel impairment needs to be compensated before the interference suppression techniques can be applied.

Based on the foregoing, there is a need for a radio communication system that enhances system capacity. There is also a need to minimize the effects of non-linearity of the communications channel.

SUMMARY OF THE INVENTION

These and other needs are addressed by the present invention, wherein an approach is provided for compensating for non-linearity in an overlaid radio communication system. An inbound signal is overlaid with the outbound signal resulting in a composite signal, and the inbound signal has a predetermined spectral configuration, such as a low-pass configuration, a bandpass configuration, or a uniformly spaced configuration. The compensation of the non-linearity depends (directly or indirectly) on an estimate of the operating point of the satellite transponder. The input power of the composite signal determines the operating point of the satellite transponder. Typically, the outbound signal is much stronger than the inbound signals. The outbound signal can be demodulated first without the need to compensate for the non-linearity. The non-linearity of the composite signal is compensated, in part, based upon an initial estimate of the outbound signal power. The estimate of the outbound signal power is employed as the initial approximation of the operating points for the satellite transponder (i.e., amplifier) associated with the non-linearity. This estimated power is used to drive a generalized inverse function that is determined using, according to one embodiment of the present invention, a look-up table (LUT). The function is associated with the non-linear characteristics of the satellite transponder. In general, the function takes the initial estimate of the operating points $x_0$ and the received composite y to produce a new estimated input signal to the satellite transponder. For instance, if the input x to the satellite transponder results in the output $xf(x)$. The function can be $y/f(x_0)$. Any function is of this property called a generalized inverse function of the non-linearity. According to an exemplary embodiment, a minimum mean-square error (MMSE) operation is used to generate an estimate of the inbound signal based upon the modified composite signal. The estimate of the inbound signal is then filtered according to the predetermined spectral configuration using, for example, a low-pass filter, a bandpass filter, or a comb filter. The filtered estimate is utilized to refine an estimate of the amplifier operating point associated with the non-linearity by iteratively performing the look-up of the LUT. Thereafter, an output signal representing the inbound signal is generated based upon the refined estimate. This approach advantageously enhances spectral efficiency, and hence system capacity.

According to one aspect of an embodiment of the present invention, a method of compensating for non-linearity in an overlaid radio communication system is disclosed. The method includes modifying a received composite signal for a non-linear effect based upon a function associated with the non-linear effect, wherein the composite signal includes a first signal overlaid onto a second signal, the first signal having a predetermined spectral configuration. The method also includes outputting an estimate of the first signal based upon the modified composite signal. Additionally, the method includes filtering the estimate of the first signal according to the predetermined spectral configuration, wherein the filtered estimate is utilized to refine an estimate of an amplifier operating point associated with the non-linearity. The method further includes generating an output signal representing the first signal based upon the refined estimate.

According to another aspect of an embodiment of the present invention, an overlaid radio communication system is disclosed. The system includes a hub station configured to communicate using an outbound signal, and a terminal configured to communicate using an inbound signal to the hub station. The inbound signal from the terminal is overlaid with the outbound signal as a composite signal, and the inbound signal has a predetermined spectral configuration. The terminal includes a module configured to modify a received composite signal for a non-linear effect based upon a function associated with the non-linear effect, to output an estimate of the inbound signal based upon the modified composite signal, and to filter the estimate of the inbound signal according to the predetermined spectral configuration. The filtered estimate is utilized to refine an estimate of an amplifier operating point associated with the non-linearity. The module generates an output signal representing the inbound signal based upon the refined estimate.

According to another aspect of an embodiment of the present invention, a device of compensating for non-linearity in an overlaid radio communication system is disclosed. The device includes means for modifying a received composite signal for a non-linear effect based upon a function associated with the non-linear effect, wherein the composite signal includes a first signal overlaid onto a second signal. The first signal has a predetermined spectral configuration. Also, the device includes means for outputting an estimate of the first signal based upon the modified composite signal, and means for filtering the estimate of the first signal according to the predetermined spectral configuration. The filtered estimate is utilized to refine an estimate of an amplifier operating point associated with the non-linearity, wherein an output signal representing the first signal is generated based upon the refined estimate.

According to another aspect of an embodiment of the present invention, a device of compensating for non-linearity in an overlaid radio communication system is disclosed. The device includes a look-up table configured to store information used to determine a function associated with a non-linear effect of a received composite signal, wherein the composite signal includes a first signal overlaid onto a second signal. The first signal has a predetermined spectral configuration. The device also includes a multiplier configured to generate a product of an entry of the look-up-table and the received composite signal. Also, the device includes an estimation module configured to output an estimate of the first signal based upon the product. Further, the device includes a filter configured to filter the estimate of the first signal according to the predetermined spectral configuration, wherein the filtered estimate is utilized to refine an estimate of an amplifier operating point associated with the non-linearity using the look-up table, wherein an output signal representing the first signal is generated based upon the refined estimate.

In yet another aspect of an embodiment of the present invention, a method for generating a waveform used in an overlaid radio communication system is disclosed. The method includes generating a plurality of inbound signals having a predetermined spectral configuration. The method also includes overlaying the plurality of inbound signals onto an outbound signal to output a composite signal. The predetermined spectral configuration partially occupies a spectrum of the outbound signal. The composite signal is transmitted over a repeater that introduces non-linearity to the composite signal, and the predetermined spectral configuration of the inbound signals is utilized to compensate for the non-linearity.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, device, and software for compensating for non-linearity in an overlaid radio communication system, are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although embodiments of the present invention are explained with respect to a satellite communication system, it is recognized that the present invention can be practiced in any type of radio communication system, including a microwave systems, cellular systems, packet radio networks, etc.

Figure 1:
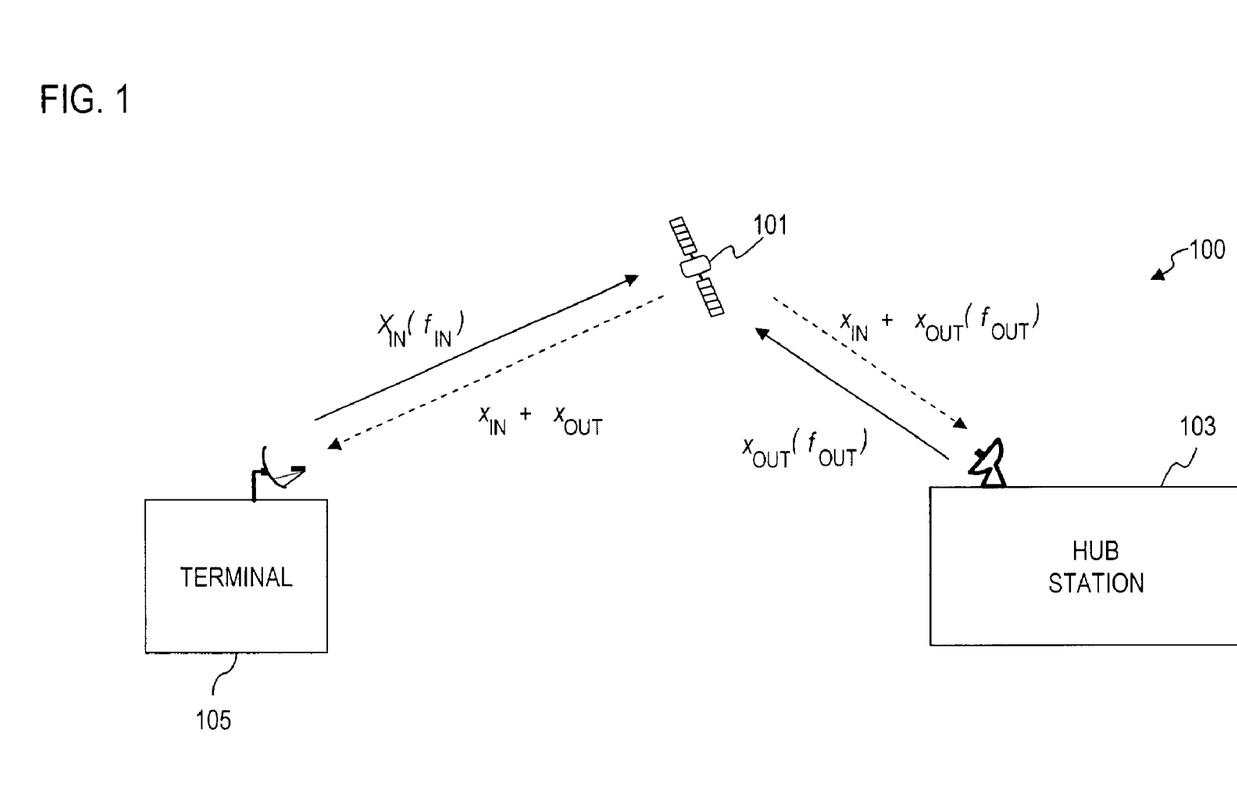
FIG. 1 is a diagram of a radio communication system capable of relaying signals using an overlay of an inbound signal with an outbound signal, according to an embodiment of the present invention.

FIG. 1 is a diagram of a radio communication system capable of relaying signals using an overlay of an inbound signal with an outbound signal, according to an embodiment of the present invention. A radio communication system 100 includes a relay station (e.g., repeater) 101 for relaying signals from a hub station 103 to a terminal 105 (i.e., outbound signals) and signals from the terminal 105 to the hub station 103 (i.e., inbound signals) for supporting two-way communication. In an exemplary embodiment, the relay station 101 is a satellite with multiple transponders, and the terminal 105 is a Very Small Aperture Terminal (VSAT) in support of data communication services.

Unlike the conventional system of FIG. 8, the system 100 employs fewer frequencies to communicate between the terminal 105 and the hub station 103. As shown, the hub station 103 transmits outbound signals at frequency, $f_{OUT}$; likewise, the terminal 105 sends inbound signals at frequency $f_{IN}$. The inbound frequency $f_{IN}$ is entirely or substantially overlapped with the outbound frequency $f_{OUT}$. Therefore, $f_{IN}$ effectively reuses the outbound frequency. The relay station 101 forwards a composite signal that includes an overlay of the inbound signal and the outbound signal to both the hub station 103 and the terminal 105 at the same frequency $f_C$. Typically, the hub station 103 sends a relatively wide band signal to the relay station 101.

The hub station 103 may send a relatively wide band signal to the relay station 101 (e.g., repeater) that further relays the signal to multiple terminals—only one of which is shown (terminal 105). The terminal 105 can send its own signals (i.e., inbound signals) to another repeater (not shown), or the same repeater 101 at a different part of the frequency band; and the repeater 101 relays the signal back to the hub station 103. As noted, the repeater 101 can be a satellite transponder.

In the system 100, the capabilities of the hub station 103 and the remote terminals 105 can be quite different. For instance, the transmission power and the antenna sizes of the remote stations 105 can be far less capable than those of the hub station 103, as to minimize the overall network cost.

The performance of the inbound signals from the terminal 105 depends, in part, on the extent to which the outbound interference can be cancelled. In practical systems, the outbound signal can be hundreds or even thousands times stronger than the inbound signals. Therefore, even if large percentage (e.g., 99%) of the outbound signal can be cancelled, the inbound signal can still experience significant amount of residual interference. Such residual interference can degrade the performance of the inbound signals significantly or limit their throughput. Accurate interference cancellation depends critically on how the channel impairments are being compensated. A dominant cause of impairments is the non-linearity of the channel, which may stem from the non-linear behavior of the satellite transponder.

The system 100 improves efficiency of spectral utilization by exploiting the spectral configuration of the inbound signals as well as the power difference between the inbound signals and the outbound signal. This difference in power is sufficiently large such that the interference by the inbound signals to the outbound signal is assumed to be negligible. As a result, the interference caused by the remote terminals to the outbound signal is very small. Thus, the terminal 105 can demodulate and decode the outbound signal without additional processing. Interference cancellation is used at the hub station 103 to recover the weak inbound signals. In principle, the inbound signals are recovered by subtracting a "reconstructed" outbound signal from the composite received signal, according to the following equation:

$$x_C = x_{IN} + x_{OUT}$$

$$x_{IN} = x_C - x_{OUT}$$

However, as described below, the non-linear characteristics make this straightforward approach less effective.

One approach to obtaining the inbound signal from the composite signal, in which the composite signal is generated by a linear amplifier, is described in commonly assigned U.S. Pat. No. 5,625,640 to Palmer et al., which is incorporated herein by reference in its entirety.

In the example of FIG. 1, it is assumed that the satellite transponders are non-linear repeaters. As a result, the non-linearity of the communications channel presents additional challenges over the system described in U.S. Pat. No. 5,625,640. With the system 100, the inbound signal from the terminal 105 can utilize any modulation, coding format (with or without spectrum spreading), whereas conventional approaches generally rely on the spread-spectrum nature of inbound signals to suppress any non-linear effect. Thus, the interference cancellation mechanism of the system 100 can be implemented without spectrum spreading. Additionally, traditional systems fail to adequately address the effect of the non-linearity in the repeater, providing no solution to counteract the degradation caused by such non-linearity.

According to one embodiment of the present invention, power amplifiers utilized in the transponders of the satellite 101 exhibit non-linear characteristics described below in FIGS. 2A and 2B.

Figure 2A:
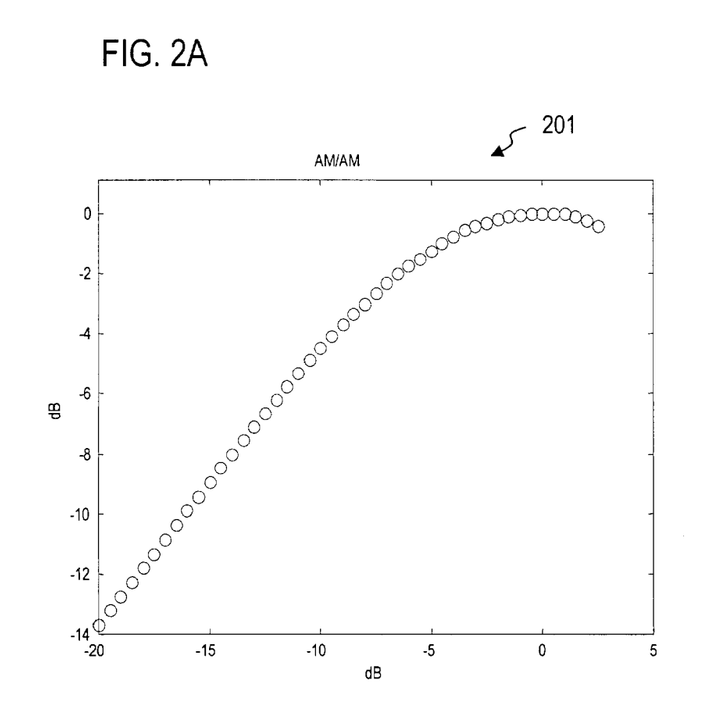
FIGS. 2A and 2B are graphs showing exemplary non-linear characteristics of an amplifier used in the system of FIG. 1.
Figure 2B:
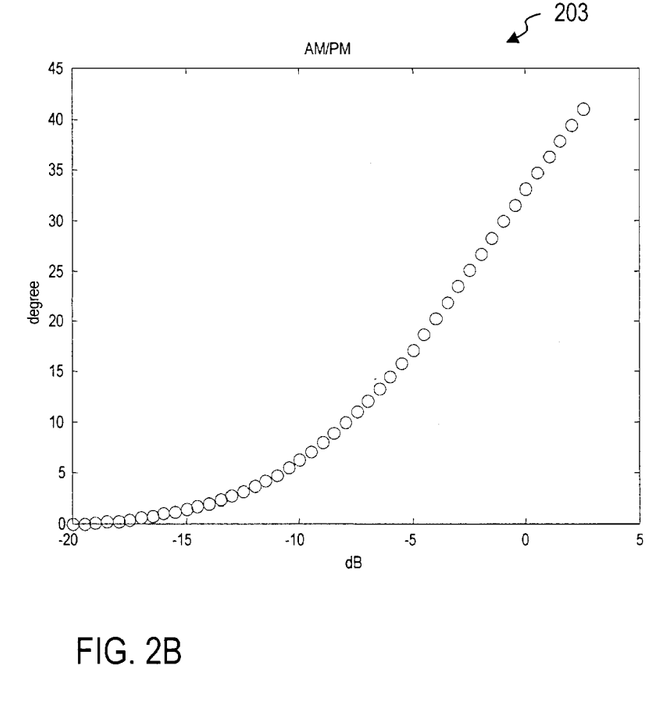

FIGS. 2A and 2B are graphs showing exemplary non-linear characteristics of an amplifier used in the system of FIG. 1. To achieve high power efficiency, the power amplifier in the repeater 101 is driven near saturation by the outbound signal. Unfortunately, operating near saturation yields non-linear behavior, in terms of amplitude and phase, as shown in graphs 201, 203, respectively. The non-linearity can be described by the AM/AM and AM/PM conversion functions of the power amplifier. The graphs 201, 203 show characteristics of a practical Traveling Wave Tube amplifier AM/AM and AM/PM conversion functions often used by satellite communications. It is clear that these functions are not linear when the amplifier is operated close to saturation point of the AM/AM conversion function. With respect to the graph 201, the amplitude behaves non-linearly above −5 dB; as regards the phase, from below −10 dB, the amplifier operates non-linearly. These non-linear characteristics of the power amplifier are a major impairment for accurate cancellation.

Non-linearity can cause intermodulation distortion when multiple signals are sent through the same power amplifier. Additionally, weaker signals are suppressed when they are amplified along with a much stronger signal. Depending on the number of inbound signals overlaid with the outbound signal, and how close to saturation the amplifiers are operated at, the residual interference can be at about the same level of thermal noise floor due to imperfect cancellation. As discussed previously, conventionally, spread spectrum inbound signals were deployed to address this cancellation challenge; however, these impairments were suppressed at the expense of overall capacity. That is, such impairments would be more severe if the inbound signals are TDMA-based instead of CDMA-based.

Figure 3A:
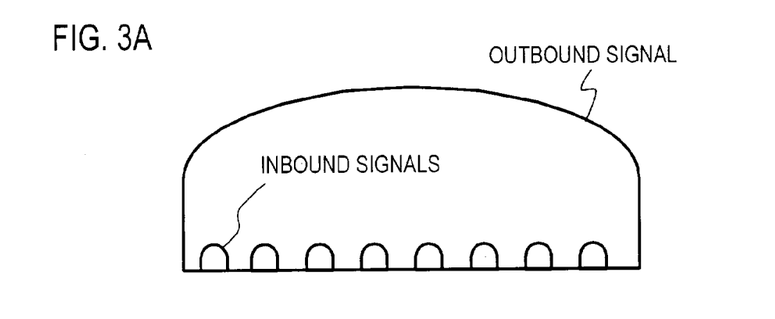
FIGS. 3A–3C are diagrams of different inbound spectral configurations used in a process for compensating for non-linearity of a received composite signal, according to an embodiment of the present invention.
Figure 3B:
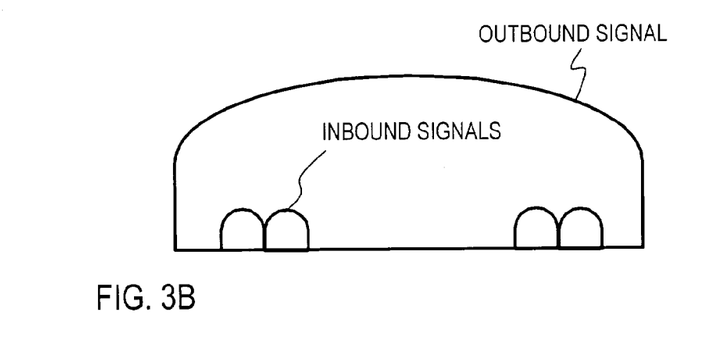
Figure 3C:
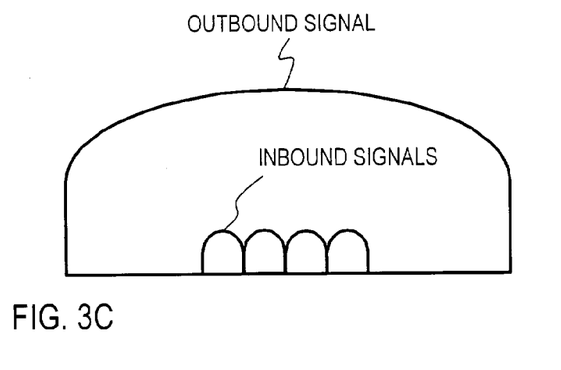

FIGS. 3A–3C are diagrams of different inbound spectral configurations used in a process for compensating for non-linearity of a received composite signal, according to an embodiment of the present invention. Although the typical downlink noise in the system is relatively small, the compensation of the non-linearity tends to enhance the downlink noise. More specifically, it is the downlink noise that prevents the non-linearity from completely being compensated. In recognition of this, by arranging the inbound signals to exhibit a certain spectral characteristic vis-à-vis the outbound signals, a receiver may exploit this information to achieve improved compensation for the non-linearity. As will be more fully described below, the receiver can take advantage of the spectral configuration by filtering the downlink noise and intermodulation extant in the estimated inbound signal.

According to an embodiment of the present invention, the system 100 utilizes an overlay approach, whereby the aggregated inbound signals partially occupy the spectrum of the outbound signal. Three exemplary scenarios are considered: uniformly spaced configuration (FIG. 3A), bandpass configuration (FIG. 3B), and low-pass configuration (FIG. 3C). In the first spectral configuration, the inbound signals are equally spaced in spectrum over the outbound signal, as shown in FIG. 3A. Also, the inbound signals may occupy the high frequency band of the outbound spectrum, as seen in FIG. 3B. Lastly, as shown in FIG. 3C, the inbound signals can be centered around the center frequency of the outbound signal.

The system 100 can more completely compensate for the non-linearity by filtering based upon the above inbound spectral configurations, as more fully described below with respect to FIGS. 4–6.

Figure 4:
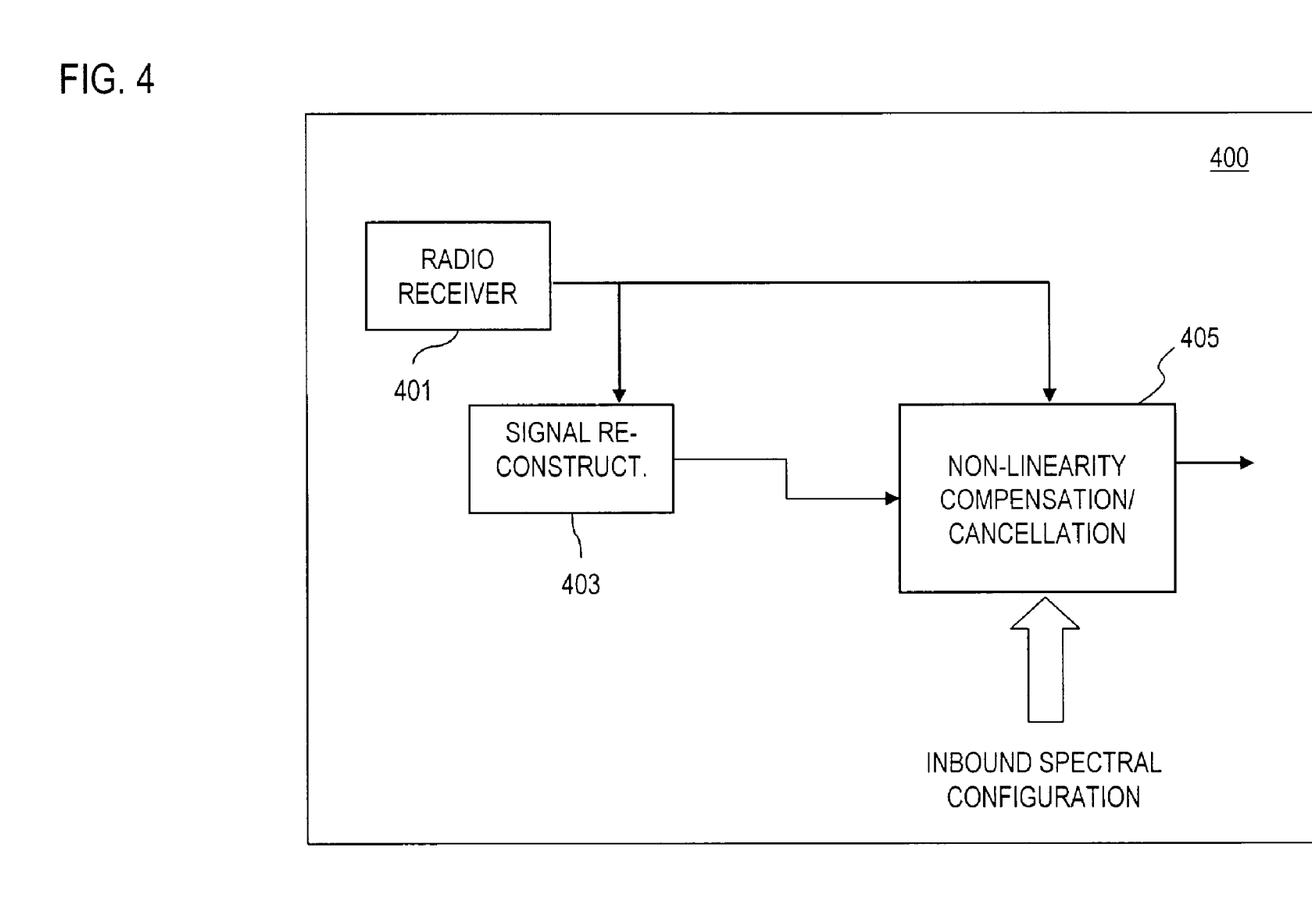
FIG. 4 is a diagram of a system for compensating for non-linearity associated with a communication channel carrying overlay signals, according to an embodiment of the present invention.

FIG. 4 is a diagram of a system for compensating for non-linearity associated with a communication channel carrying overlay signals, according to an embodiment of the present invention. Receiver circuitry 400, in an exemplary embodiment, can be deployed in the hub station 103 (FIG. 1) and extracts an inbound signal or multiple inbound signals from a composite signal received from the relay station 101. Conceptually, the received signal is sent through a "model" that emulates the repeater non-linearity and, optionally, a group delay of the noise-limiting filter. The receiver circuitry 400 exploits the arranged spectral configuration of the inbound signals, whereby these inbound signals occupy only a portion of the outbound signal (as shown in FIGS. 3A–3C).

The receiver circuitry 400 includes a radio receiver 401 for receiving the composite signal. To cancel the outbound signal from the composite received signal, the receiver 401 at the hub station 103 needs to know what is transmitted from the hub station 103 as a reference. Because the outbound signal is significantly stronger than the inbound signals, the receiver 401 can demodulate the composite signal and then, in an exemplary embodiment, reconstruct the outbound signal as a reference signal. According to one embodiment of the present invention, a reference outbound signal is regenerated from the composite signal by a signal reconstruction module 403. Alternatively, the outbound signal can be buffered at the hub station 103 to serve as the reference signal.

To achieve accurate interference cancellation, the reconstructed outbound signal is passed through a non-linearity compensation and cancellation module 405, which iteratively estimates the inbound signal using knowledge of the inbound spectral configuration. The non-linearity compensation and cancellation module 405 applies a filter corresponding to the inbound spectral configuration; for example, the uniformly spaced configuration (FIG. 3A), bandpass configuration (FIG. 3B), and low-pass configuration (FIG. 3C) can be addressed using a comb filter, a bandpass filter, and a low-pass filter, respectively. The generation of the inbound signal is more fully described below with respect to FIG. 5.

Although the modules 401, 403, 405 are described with respect to individual functionalities, it is recognized that any combination of the modules may implemented collectively or individually in hardware (e.g., Field Programmable Gate Array (FPGA), Application Specific Integrated Circuit (ASIC), etc.) and/or software.

Figure 5:
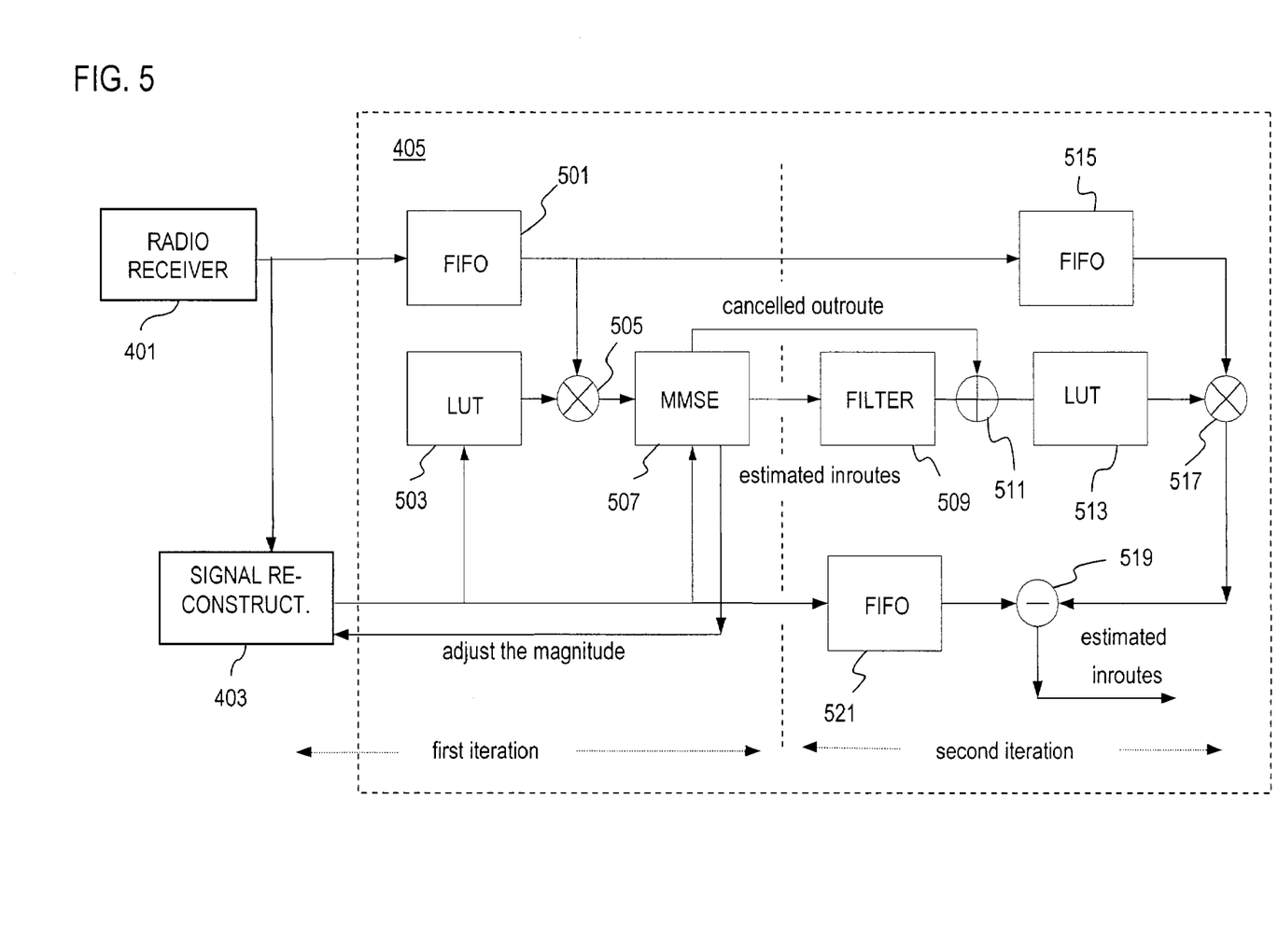
FIG. 5 is a diagram of the non-linearity compensation and cancellation circuitry of the system of FIG. 4.

FIG. 5 is a diagram of the non-linearity compensation and cancellation circuitry of the system of FIG. 4. To reliably recover the inbound signals, the outbound signal has to be cancelled, such that the cancellation accurately accounts for the non-linearity. The non-linearity of the communication channel can be determined from the received composite signal through an adaptive learning process. According to one embodiment of the present invention, the non-linear characteristics of the power amplifier are assumed to be known or pre-estimated.

It is assumed that the amplifier of the repeater 101 exhibits a non-linear function $xf(x)$. Accordingly, with the complex input x, the output of the non-linear amplifier is $xf(x)$. The difficulty in compensating the non-linearity is two-fold. First, the downlink noise will distort the received signal. Secondly, the instantaneous operating point of the amplifier is not known.

Essentially, the non-linearity compensation and cancellation module 405 uses an adaptive learning approach by iteratively refining the estimate of the operating point of the amplifier, in part, by filtering an estimated inbound signal that is used to determine the operating point in a subsequent iteration.

The non-linearity compensation and cancellation module 405, according to one embodiment of the present invention, includes a buffer (e.g., First In First Out) 501 for storing a received composite signal. The module 405 also utilizes a Look Up Table (LUT) 503. The LUT 503 implements the function $1/f(x)$. The signal constructed by module 403 serves as the initial estimate of the amplifier operating point associated with the non-linearity to produce an output from the LUT 503. A multiplier 505 multiplies the composite signal from the FIFO 501 and the output from the LUT 503, outputting the resultant signal to a Minimum Mean-Square Error (MMSE) module 507. The MMSE module 507 cancels the outroute portion from the signal at the output of the multiplier 505. The MMSE module 507 couples to a filter 509 that filters the estimated inroutes from the MMSE module 507 according to the inbound spectral configuration (as shown in FIGS. 3A–3C). The output of an adder 511 is a combined signal representing the filtered inbound signals and the cancelled outbound signal from the MMSE module 507.

The circuitry 405 of FIG. 5, in an exemplary embodiment, implements two-iteration scheme of look-up to determine the non-linearity of the repeater amplifier, whereby this combined signal is input into another LUT 513. The output from the LUT 513 and FIFO 515 (which stores the received composite signal) are combined at multiplier 517, which outputs to a subtractor 519. The subtractor 519 then estimates inbound signals based on the output of the multiplier 517 and a FIFO 521, which stores the remodulated outbound signal.

Although the compensation and cancellation module 405 utilizes a number of specific mathematical logic (e.g., multipliers 505, 517, adder 511, substractor 519), it is recognized that other logic can be utilized to achieve the equivalent mathematical results. The operation of the module 405 is further detailed in FIG. 6, below.

Figure 6:
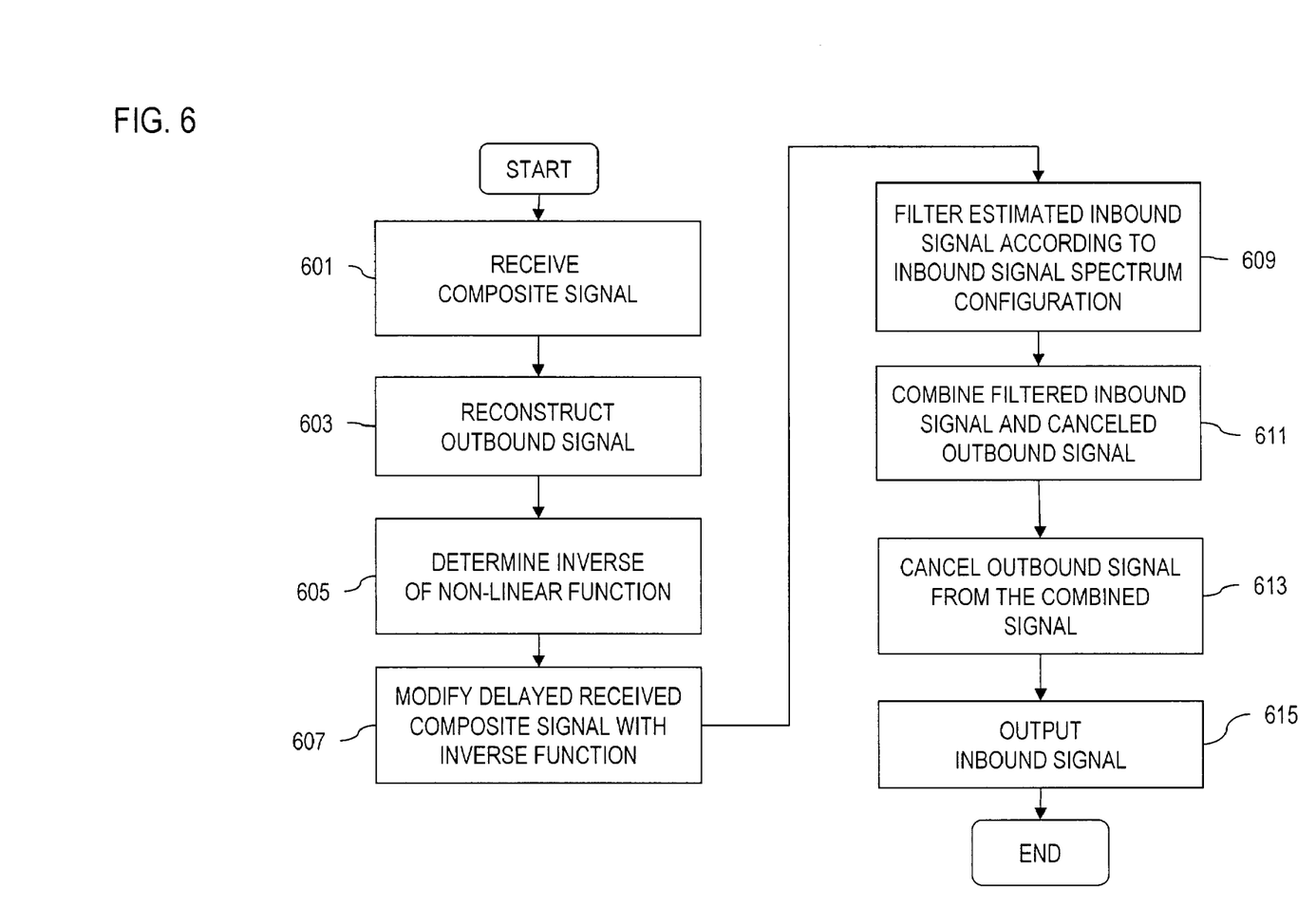
FIG. 6 is a flowchart of the operation of the non-linearity compensation and cancellation circuitry of FIG. 5.

FIG. 6 is a flowchart of the operation of the non-linearity compensation and cancellation circuitry of FIG. 5. Upon receiving the composite inbound and outbound signal from the satellite 101, the outbound signal is first demodulated and remodulated, per steps 601 and 603. Because the outbound signal is significantly stronger than the inbound signal, the remodulated signal from the signal construction module 403 can accurately regenerate the outbound signal. This remodulated signal is used to drive the LUT 503 as the initial estimate of the instantaneous operating point of the non-linear amplifier, as in step 605. That is, the LUT 503 outputs a signal equal to $1/f(x)$, which is multiplied via the multiplier 505 to the delayed received signal from the satellite 101 via the FIFO 501, per step 607. It is noted that because $f(x)$ effectively represents the non-linear effects of the amplifier of the repeater 101, the product of the multiplier 505 provides compensation for these non-linear effects. The product is fed into the Minimum Mean Squared error (MMSE) module 507 for cancellation with the reconstructed outbound signal. Accordingly, the MMSE module 507 produces the estimated inbound signals and the cancelled outbound signal.

The estimated inbound signal, as in step 609, is further filtered by the filter 509 and summed together via the adder 511 (step 611) to drive the input of the other LUT 513 for the next iteration. The filter 509 operates either as a low-pass filter, a bandpass filter, or a comb filter, depending on the inbound signal spectral configuration; for the configuration illustrated FIG. 3A, a comb filter will be used to eliminate any downlink noise or intermodulation residing in between the inbound signals. For the configuration illustrated in FIGS. 3B and 3B, bandpass and low-pass filters, respectively, are used. In other words, the characteristics of the filter 509 used in between iteration matches the spectral configuration of the inbound signal relative to that of the outbound signal. In this manner, the estimated inbound signal, after eliminating the outbound signal, provides a better estimation for the next iteration in the iterated compensation scheme.

Next, in step 613, the output from the multiplier 517 is input to the substractor 519, which cancels the outbound signal from the product using the reconstructed outbound signal that is stored in the FIFO 521. Accordingly, the estimated inbound signals are output from the subtractor 519, per step 615.

It is recognized that the non-linearity compensation and cancellation module 405 can iteratively perform the estimation process according any number of iterations to refine the estimate of the instantaneous operating point of the amplifier, thus the inroute signals. In this scenario, the number of iterations is two. The above process advantageously supports efficient spectrum reuse by increasing the viability of an overlaid system.

Figure 7:
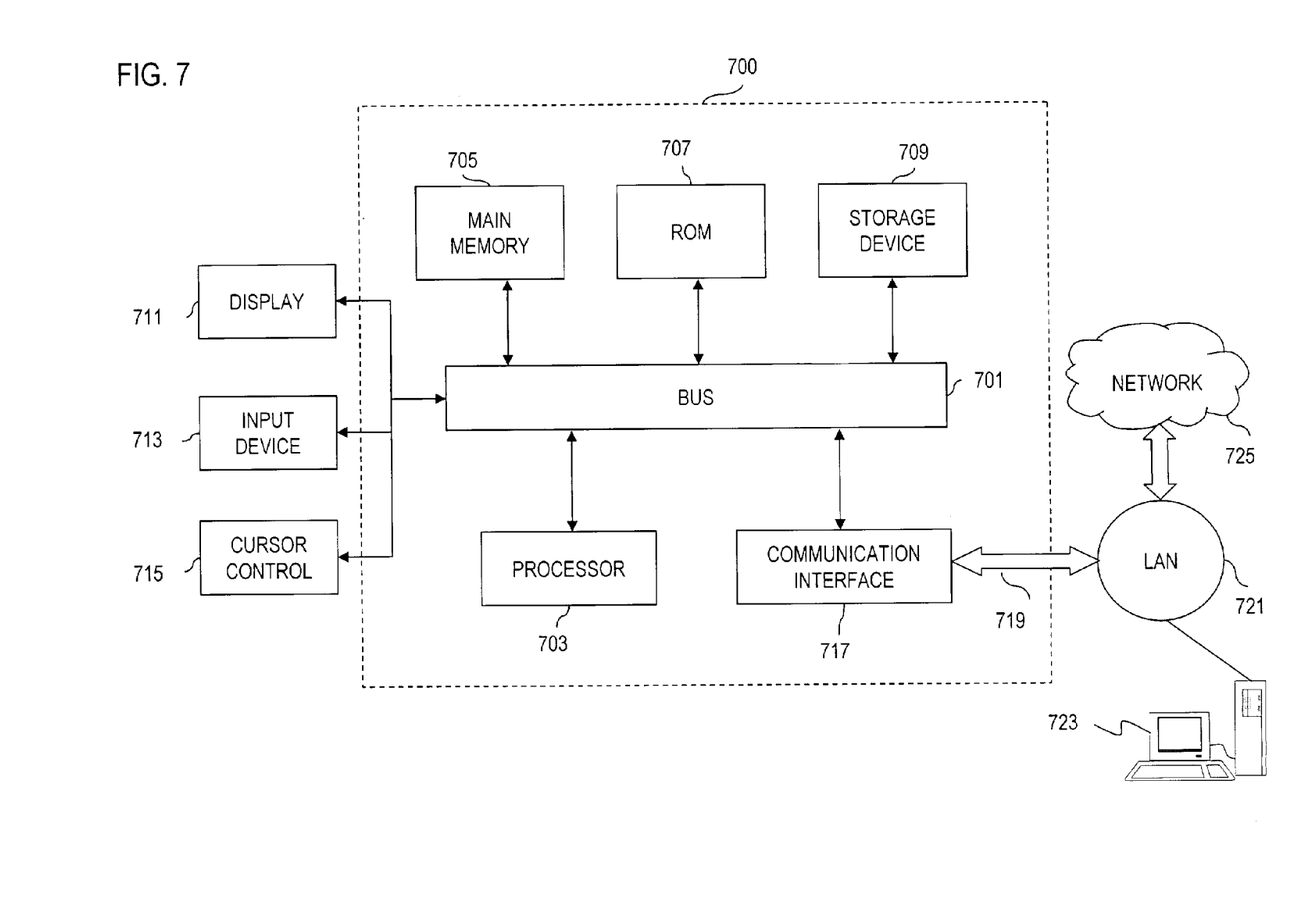
FIG. 7 is a diagram of a computer system that can perform signal compensation, in accordance with an embodiment of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, the process of FIG. 6 is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 703 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, an approach is provided for compensating for non-linearity in an overlaid radio communication system, whereby an inbound signal is overlaid with the outbound signal as a composite signal, and the inbound signal has a predetermined spectral configuration, such as a low-pass configuration, a bandpass configuration, or a uniformly spaced configuration. a minimum mean-square error (MMSE) operation is used to generate an estimate of the inbound signal based upon the modified composite signal. The estimate of the inbound signal is then filtered according to the predetermined spectral configuration using, for example, a low-pass filter, a bandpass filter, or a comb filter. The filtered estimate is utilized to refine an estimate of the amplifier operating point associated with the non-linearity by iteratively performing the look-up of the LUT. Thereafter, an output signal representing the inbound signal is generated based upon the refined estimate. This approach advantageously enhances spectral efficiency, and hence system capacity.

While the present invention has been described in connection with a number of embodiments and implementations, the present invention is not so limited but covers various obvious modifications and equivalent arrangements, which fall within the purview of the appended claims.

What is claimed is:

1. A method of compensating for non-linearity in an overlaid radio communication system, the method comprising:
   modifying a received composite signal for a non-linear effect based upon a function associated with the non-linear effect, wherein the composite signal includes a first signal overlaid onto a second signal, the first signal having a predetermined spectral configuration;
   outputting an estimate of the first signal based upon the modified composite signal;
   filtering the estimate of the first signal according to the predetermined spectral configuration, wherein the filtered estimate is utilized to refine an estimate of an amplifier operating point associated with the non-linearity; and
   generating an output signal representing the first signal based upon the refined estimate.

2. A method according to claim 1, further comprising:
   performing a table look-up to determine the non-linear function associated with the non-linear effect.

3. A method according to claim 2, wherein the predetermined spectral configuration in the modifying step includes one of a low-pass configuration, a bandpass configuration, and a uniformly spaced configuration, and the filtering step is performed using, respectively, a low-pass filter, a bandpass filter, and a comb filter.

4. A method according to claim 1, wherein the radio communication system includes a terminal in communication via satellite with a hub station, the first signal supporting communication from the terminal to the hub station, and the second signal supporting communication from the hub station to the terminal.

5. A method according to claim 4, wherein the non-linear effect is associated with a transponder of the satellite.

6. A method according to claim 1, further comprising:
performing a Minimum Mean-Square Error operation to cancel the second signal from the composite signal, wherein the canceled second signal is combined with the filtered estimate of the first signal.

7. A computer-readable medium bearing instructions for compensating for non-linearity in an overlaid radio communication system, the instructions being arranged, upon execution, to cause one or more processors to perform the step of a method according to claim 1.

8. An overlaid radio communication system, comprising:
a hub station configured to communicate using an outbound signal; and
a terminal configured to communicate using an inbound signal to the hub station, wherein
the inbound signal from the terminal is overlaid with the outbound signal as a composite signal, the inbound signal having a predetermined spectral configuration, the terminal including,
a module configured to modify a received composite signal for a non-linear effect based upon a function associated with the non-linear effect, to output an estimate of the inbound signal based upon the modified composite signal, and to filter the estimate of the inbound signal according to the predetermined spectral configuration, wherein the combined signal of the filtered estimate and the canceled second signal is utilized as the estimate of the operating point associated with the non-linearity to further compensate the non-linearity in an iterative manner, the module generating an output signal representing the inbound signal based upon the final estimated operating point.

9. A system according to claim 8, wherein the module of the terminal is further configured to perform a table look-up to determine the inverse function.

10. A system according to claim 8, wherein the predetermined spectral configuration includes one of a low-pass configuration, a bandpass configuration, and a uniformly spaced configuration, and the module performs, respectively, low-pass filtering, bandpass filtering, and a comb filtering.

11. A system according to claim 8, further comprising:
a satellite configured to relay the composite signal between the terminal and the hub station.

12. A system according to claim 11, wherein the non-linear effect is associated with a transponder of the satellite.

13. A system according to claim 8, wherein the module of the terminal is further configured to perform a Minimum Mean-Square Error operation to cancel the outbound signal from the composite signal, wherein the canceled outbound signal is multiplied with the filtered estimate of the inbound signal.

14. A device of compensating for non-linearity in an overlaid radio communication system, the device comprising:
means for modifying a received composite signal for a non-linear effect based upon a function associated with the non-linear effect, wherein the composite signal includes a first signal overlaid onto a second signal, the first signal having a predetermined spectral configuration;

means for outputting an estimate of the first signal based upon the modified composite signal; and
means for filtering the estimate of the first signal according to the predetermined spectral configuration, wherein the filtered estimate is utilized to refine an estimate of an amplifier operating point associated with the non-linearity, wherein an output signal representing the first signal is generated based upon the refined estimate.

15. A device according to claim 14, further comprising:
a look-up table for storing information used to determine the inverse function.

16. A device according to claim 15, wherein the predetermined spectral configuration includes one of a low-pass configuration, a bandpass configuration, and a uniformly spaced configuration, and the filtering means is adapted to be, respectively, a low-pass filter, a bandpass filter, and a comb filter.

17. A device according to claim 14, wherein the radio communication system includes a terminal in communication via satellite with a hub station, the first signal supporting communication from the terminal to the hub station, and the second signal supporting communication from the hub station to the terminal.

18. A device according to claim 17, wherein the non-linear effect is associated with a transponder of the satellite.

19. A device according to claim 14, further comprising:
performing a Minimum Mean-Square Error operation to cancel the second signal from the composite signal in response to the reconstructed, wherein the canceled second signal is multiplied with the filtered estimate of the first signal.

20. A device of compensating for non-linearity in an overlaid radio communication system, the device comprising:
a look-up table configured to store information used to determine an inverse function associated with a non-linear effect of a received composite signal, wherein the composite signal includes a first signal overlaid onto a second signal, the first signal having a predetermined spectral configuration;
a multiplier configured to generate a product of an entry of the look-up table and the received composite signal;
an estimation module configured to output an estimate of the first signal based upon the product; and
a filter configured to filter the estimate of the first signal according to the predetermined spectral configuration, wherein the filtered estimate is utilized to refine an estimate of the amplifier operating point associated with the non-linearity using the look-up table, wherein an output signal representing the first signal is generated based upon the refined estimate.

21. A device according to claim 20, wherein the predetermined spectral configuration includes one of a low-pass configuration, a bandpass configuration, and a uniformly spaced configuration, and the filter is adapted, respectively, to be a low-pass filter, a bandpass filter, and a comb filter.

22. A device according to claim 20, wherein the radio communication system includes a terminal in communication via satellite with a hub station, the first signal supporting communication from the terminal to the hub station, and the second signal supporting communication from the hub station to the terminal.

23. A device according to claim 22, wherein the non-linear effect is associated with a transponder of the satellite.

24. A device according to claim 20, wherein the estimation module is configured to perform a Minimum Mean-square error operation to cancel the second signal from the composite signal, wherein the canceled second signal is multiplied with the filtered estimate of the first signal.

25. A method for generating a waveform used in an overlaid radio communication system, the method comprising:
  generating a plurality of inbound signals having a predetermined spectral configuration; and
  overlaying the plurality of inbound signals onto an outbound signal to output a composite signal, the predetermined spectral configuration partially occupying a spectrum of the outbound signal,
  wherein the composite signal is transmitted over a repeater that introduces non-linearity to the composite signal, and the predetermined spectral configuration of the inbound signals is utilized to compensate for the non-linearity.

26. A method according to claim 25, wherein the predetermined spectral configuration in the generating step includes one of a low-pass configuration, a bandpass configuration, and a uniformly spaced configuration.

27. A method according to claim 25, wherein the radio communication system includes a plurality of terminals in communication via satellite with a hub station, the inbound signals supporting communication from the terminals to the hub station, and the outbound signal supporting communication from the hub station to the terminals.

28. A computer-readable medium bearing instructions for generating a waveform used in an overlaid radio communication system, the instructions being arranged, upon execution, to cause one or more processors to perform the step of a method according to claim 25.

* * * * *